United States Patent
Zhou et al.

(10) Patent No.: US 12,182,771 B2
(45) Date of Patent: Dec. 31, 2024

(54) FEDERATED LEARNING FOR MULTI-LABEL CLASSIFICATION MODEL FOR OIL PUMP MANAGEMENT

(71) Applicant: INTERNATIONAL BUSINESS MACHINES CORPORATION, Armonk, NY (US)

(72) Inventors: Nianjun Zhou, Chappaqua, NY (US); Dhavalkumar C. Patel, White Plains, NY (US); Anuradha Bhamidipaty, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1051 days.

(21) Appl. No.: 17/123,088

(22) Filed: Dec. 15, 2020

(65) Prior Publication Data

US 2022/0188775 A1 Jun. 16, 2022

(51) Int. Cl.
G06Q 10/20 (2023.01)
G06N 3/098 (2023.01)
G06Q 50/06 (2024.01)

(52) U.S. Cl.
CPC ............. *G06Q 10/20* (2013.01); *G06N 3/098* (2023.01); *G06Q 50/06* (2013.01)

(58) Field of Classification Search
CPC ......... G06Q 10/20; G06Q 50/06; G06N 3/098
See application file for complete search history.

(56) References Cited

U.S. PATENT DOCUMENTS 6,155,840 A 12/2000 Sallette
6,708,163 B1 * 3/2004 Kargupta ................ G06F 16/27
707/999.12

(Continued)

FOREIGN PATENT DOCUMENTS

CN 111369042 A 7/2020
CN 111382706 A 7/2020

(Continued)

OTHER PUBLICATIONS

International Search Report and Written Opinion issued Mar. 9, 2022 in related International Patent Application No. PCT/IB2021/061237; 11 pages.

(Continued)

*Primary Examiner* — Michael J Huntley
*Assistant Examiner* — Maggie Thanh Maido
(74) *Attorney, Agent, or Firm* — Intelletek Law Group, PLLC; Gabriel Daniel, Esq.

(57) ABSTRACT

A computer implemented federated learning method of predicting failure of assets includes generating a local model at a local site for each of the cohorts and training the local model on local data for each of the cohorts for each failure type. The local model is shared with a central database. A global model is created based on an aggregation of a plurality of the local models from a plurality of the local sites. At each of the plurality of local sites, one of the global model and the local model is chosen for each of the cohorts. The chosen model operates on local data to predict failure of the assets. The utilized features include partitioning features of the assets into static features, semi-static features, and dynamic features, and forming cohorts of the assets based on the static features and the semi-static features.

25 Claims, 9 Drawing Sheets

(56) References Cited

U.S. PATENT DOCUMENTS

| | | | |
|---|---|---|---|
| 7,610,264 | B2 | 10/2009 | Ewen |
| 8,924,313 | B2 | 12/2014 | Chidlovskii |
| 10,325,220 | B2 | 6/2019 | Li et al. |
| 10,460,255 | B2 | 10/2019 | Nagaraju et al. |
| 10,536,437 | B2 | 1/2020 | Bellala et al. |
| 10,565,524 | B2 | 2/2020 | Bellala et al. |
| 10,657,461 | B2 | 5/2020 | McMahan et al. |
| 2011/0235900 | A1 | 9/2011 | Porikli et al. |
| 2012/0023043 | A1* | 1/2012 | Cetin ............... G06Q 30/0254 706/12 |
| 2017/0308802 | A1 | 10/2017 | Ramsoy et al. |
| 2018/0018590 | A1 | 1/2018 | Szeto et al. |
| 2018/0107791 | A1 | 4/2018 | Guo et al. |
| 2018/0157743 | A1 | 6/2018 | Hori et al. |
| 2019/0197411 | A1 | 6/2019 | Di et al. |
| 2019/0332662 | A1 | 10/2019 | Middendorf et al. |
| 2020/0027033 | A1 | 1/2020 | Garg et al. |
| 2020/0364608 | A1 | 11/2020 | Anwar et al. |
| 2022/0138260 | A1* | 5/2022 | Koval ............... G01C 21/3841 707/798 |
| 2022/0139117 | A1* | 5/2022 | Zhang ............... G06N 3/08 701/29.4 |
| 2023/0177349 | A1* | 6/2023 | Balakrishnan ..... H04L 67/10 706/25 |
| 2023/0289623 | A1* | 9/2023 | Zhang ............... G06N 20/00 |

FOREIGN PATENT DOCUMENTS

| | | |
|---|---|---|
| CN | 111737749 A | 10/2020 |
| CN | 111754000 A | 10/2020 |
| CN | 111798002 A | 10/2020 |

OTHER PUBLICATIONS

Liang et al.; "Think Locally, Act Globally: Federated Learning With Local and Global Representations", Cornell University Library, arXiv:2001.01523v2, pp. 1-21, Feb. 28, 2020.

Hanzely et al.; "Federated Learning of a Mixture of Global and Local Models", Cornell University Library, arXiv:2002.05516v2, pp. 1-43, Feb. 14, 2020.

Zhu et al.; "Multi-Label Learning With Global and Local Label Correlation", TKDE IEEE Transactions on, vol. 30, Issue 6, pp. 1081-1094, Jun. 1, 2018.

Souza et al.; "Multi-Label Learning for Dynamic Model Type Recommendation", Cornell University Library, arXiv:2004.00558v1, pp. 1-10, Apr. 1, 2020.

Zhang et al.; "Hierarchical Multi-Label Classification Using Fully Associative Ensemble Learning", Pattern Recognition, vol. 70, pp. 89-103, Oct. 2017.

Huang, H. et al. "Prophet: Proactive Candidate-Selection for Federated Learning by Predicting the Qualities of Training and Reporting Phases"; arXiv:2002.00577v1 (2020); 10pgs.

Zhao, H. et al., "A Deep Learning Approach for Condition-Based Monitoring and Fault Diagnosis of Rod Pump System"; Research Gate (2017); 12 pgs.

Xu, C. et al., "Hierarchical Classification Based on Label Distribution Learning"; The Thirty-Third AAAI Conference on Artificial Intelligence (AAAI-19); 2019; 8 pgs.

Feng, S. et al., "Multi-Participant Multi-Class Vertical Federated Learning"; arXiv:2001.11154v1 (2020); 7 pgs.

Konecny, J. et al., "Federated Learning: Strategies for Improving Communication Efficiency", arXiv:1610.05492v2 [cs.LG] (2017), 10 pgs.

* cited by examiner

FEDERATED LEARNING FOR MULTI-LABEL CLASSIFICATION MODEL FOR OIL PUMP MANAGEMENT

BACKGROUND

Technical Field

The present disclosure generally relates to artificial intelligence and machine learning systems, and more particularly, to methods and systems for distributed learning for multi-label classification models for industrial equipment repair and maintenance, such as oil pump preventive management.

Description of the Related Art

Oil and other mining industry companies need to maintain their assets. In the oil field, companies need to maintain pump wells in good condition to produce high oil production. The current trend is to use a preventive maintenance approach, where the success of a cost-effective preventative maintenance approach relies on the accuracy of the prediction of the need for maintenance of specific parts.

Large oil companies have a global footprint in many different geographic regions to pump oil. Each site is open to sharing the aggregated knowledge for having a better predictive model, but the sites have a limitation on sharing the detailed operation sensor data, for example, due to privacy considerations and management issues.

Current general prediction models have substantial limitations. These limitations include the lack of data sharing between sites, the lack of fault examples, and scenarios for individual geographic sites. Different scenarios of operation states can involve different models, and building one universal predictive model might not fit for local conditions as a specific geographic site.

Therefore, there is a need to have an approach to develop and improve the predictive/classification model that can be managed both locally and globally.

SUMMARY

According to various embodiments, a computing device, a non-transitory computer readable storage medium, and a method are provided for developing and improving a predictive model for asset failure where only the models are shared among different sites.

In one embodiment, a computer implemented method of predicting failure of assets includes partitioning features of the assets into static features, semi-static features and dynamic features and forming cohorts of the assets based on the static features and the semi-static features. The method further includes generating a local model at a local site for each of the cohorts and training the local model on local data for each of the cohorts for each failure type. The local model is shared with a central database. A global model is created based on an aggregation of a plurality of the local models from a plurality of the local sites. At each of the plurality of local sites, one of the global model and the local model is chosen for each of the cohorts. The chosen model operates on local data to predict the failure of one or more of the assets belonging to this cohort.

In some embodiments, the method further includes generating a template model for creating each of the local models for each of the cohorts.

In some embodiments, the method further includes pooling the local models from each of the plurality of local sites into a pool of local models and determining the performance of the global model and a selected one of the local models from the pool of local models.

In some embodiments, the method further includes updating the global model based on an average of each of the local models in the pool of local models for each of the cohorts. In some embodiments, each of the local models in the pool of local models is weighted based on an average number of assets of the local site that provided the local model to the pool of local models.

According to various embodiments, a computer implemented method for predicting failure of assets includes partitioning features of the assets into static features, semi-static features, and dynamic features and forming cohorts of the assets based on the static features and the semi-static features. A local model is generated at a local site for each of the cohorts, and the local model is shared with a central database. A pool of local models is created from a plurality of the local models from a respective plurality of the local sites. A global model is created based on an aggregation of the plurality of the local models from the plurality of the local sites. At each of the plurality of local sites, one of the global models and one of the pluralities of local models from the pool of local models is chosen for each of the cohorts. The chosen model operates on local data to predict failure of the assets.

According to various embodiments, a computer implemented method for prediction failure of assets includes partitioning features of the assets into static features, semi-static features and dynamic features and forming cohorts of the assets based on the static features and the semi-static features. A local model is generated at a local site for each of the cohorts and a global model is created for each of the cohorts. At each of a plurality of local sites, one of the global model and the local model is chosen for each of the cohorts. The chosen model operates on local data to predict the failure of the assets belong to the cohost where the model is developed.

By virtue of the concepts discussed herein, a system and method are provided that improves upon the approaches currently used to predict asset failure. The system and methods discussed herein can improve the accuracy of asset failure prediction models by sharing information among different sites without compromising privacy and security.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As used herein, the term "distributed learning" refers to a learning model where local data is not shared, only models (local and global) are shared among distributed sites.

As used herein, the term "multi-learning classification" refers to a classification problem where multiple labels may be assigned to each case, where they are not mutually exclusive.

As used herein, the term "cohort" refers to, instead of grouping all the assets as a single category, breaking down the assets into different groups for better analysis and prediction.

As used herein, the term "global model" refers to a model for a specific cohort, where a local site is allowed to use the global model, either due to lack of a local model, or because the local model is not as good as the global model.

As used herein, the term "local model" refers to the model used at a local site.

As used herein, the term "model aggregator" refers to an updated global model based on the collective of local models and their usage.

As used herein, the term "model selection at a local site" refers to an algorithm used to select a local model to use at the local site, where the pool of the candidate models comes from either the global model for a cohort and/or local models from other sites.

As discussed in greater detail below, the present disclosure generally relates to methods and systems for industrial asset management, such as oil pump management, by distributed learning. The methods and systems use a central approach to store a cohort model and prediction model and dispatch the centralized models to local sites as a starting point for the local site. The methods and systems can use a distributed approach to refine and improve the prediction model performance at a local site, resulting in local refinement by retraining the model with the same model structure and initial features. A centralized management of the cohort model can help ensure learning from each site will be aligned to a common or similar scenario group. The systems and methods of the present disclosure can provide a significant improvement in asset failure prediction management models by sharing models across multiple sites in efforts to use information learned from one site at other sites, without having to share the specific details of any specific asset failure.

Further, as discussed in greater detail below, the present disclosure provides systems and methods that can perform model mismatch analysis to decide when to update the local model and generate model refinements. The systems and methods can apply a predictive model, including but not limited to traditional and deep learning model architecture for a prediction or classification model with sufficient model complexity to allow model integration from the different sites and to avoid loss of accuracy for other sites after global model integration.

There are three main types of oil pumps—a submersible pump or electric submersible pump (ESP), a progressing cavity pump (PCP), and a reciprocating rod lift (RRL). Each of these pumps can represent a specific cohort. The types of machinery belong to same cohort sharing similar structures and functionalities. There are three major types of component failures, including pump failure, rod failure, and tubing failure. These failure types can be defined as the labels. While the instant disclosure defines the cohorts as different pumps in the oil industry, it should be understood that other assets may be defined as the cohorts, depending on the desired application and industry.

Reference now is made in detail to the details illustrated in the accompanying drawings and discussed below.

Figure 1:
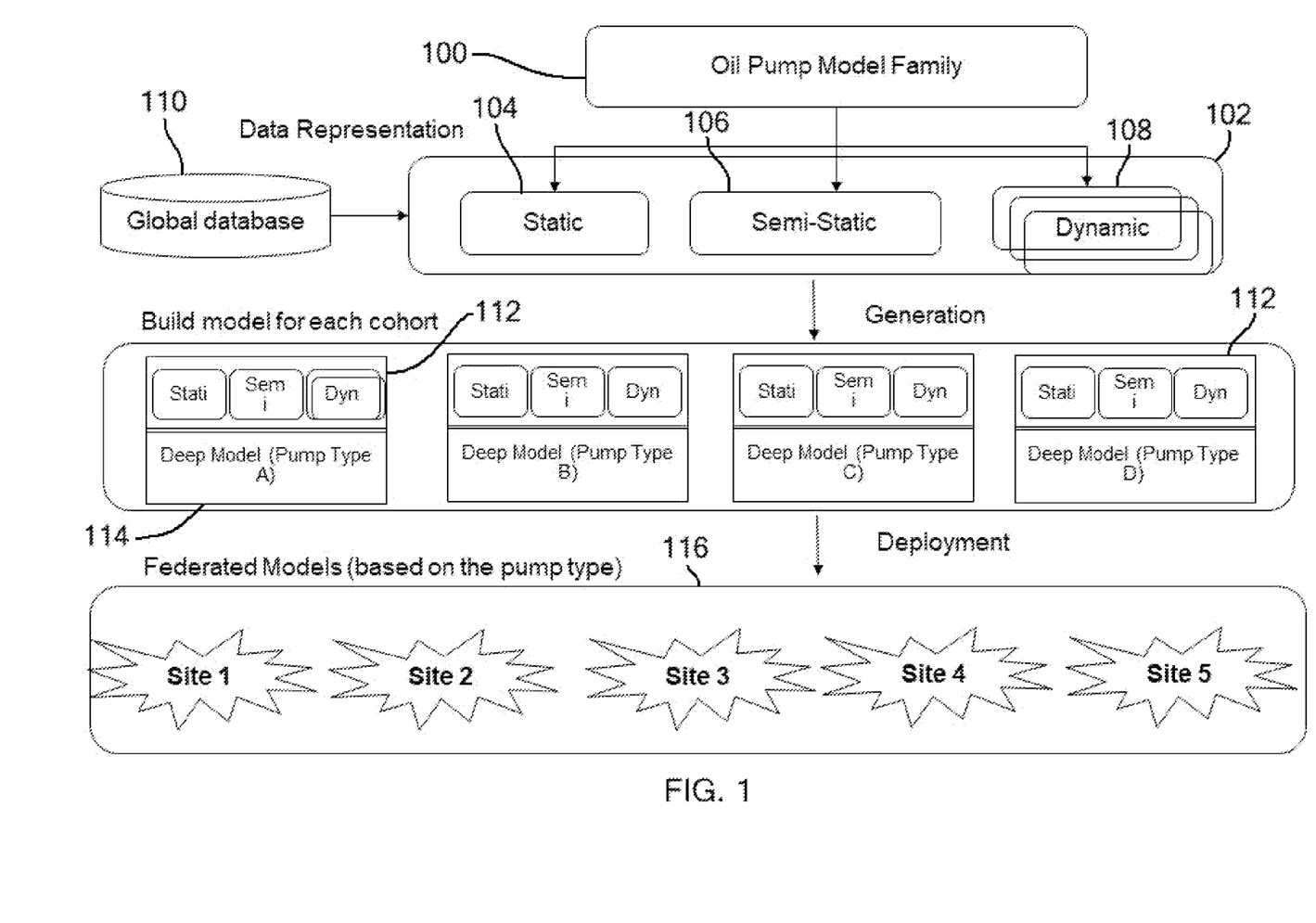
FIG. 1 is a representation of model deployment based on feature grouping, according to an embodiment of the present disclosure.

Referring to FIG. 1, details for each oil pump model family 100 can be used to provide a set of features 102 for that model family 100. The set of features 102 can include static features 104, semi-static features 106, and dynamic features 108. A global database 110 can be maintained that includes data regarding each asset (e.g., each pump family) and the features of each asset. Static features 104 can include information that typically does not change for an asset, such as the asset purchase year, model number, brand, geographic location, and the like. Semi-static features 106 can include information that changes slowly, such as days from purchase, the days from last maintenance, number of scheduled maintenance from purchase, the average days of repair intervals, and the like. Certain data transformation may be needed to convert the static and semi-static data into usable features, as discussed below. Dynamic features 108 include information from monitoring sensors. Typically, dynamic features 108 will provide a failure signal in a short time horizon. Certain data aggregation and transformation might be used to convert this data into usable features, such as hourly/daily average, exponential smoothness, outlier identification, missing values for a previous week, or the like.

The assets can be divided into one or more cohorts 112. In the example of FIG. 1, the cohorts are based on pump type (pump type A, pump type B, pump type C, and pump type D), but, depending on the asset of interest, the cohorts may be established based on any given asset or division of assets. For example, a windmill farm may divide cohorts into different power generation components, such as bearings, inverters, storage devices, or the like. In some embodiments, the cohorts 112 can be created by analyzing the static and semi-static features of the assets, where a given cohort can have similar static and/or semi-static features for a given asset.

As shown in FIG. 1, cohorts 112 can include the static features 104, semi-static features 106, and dynamic features 108 for that particular asset. A failure prediction model 114 (also referred to as a global model 114) can be built for each cohort. The global model 114 may be based on a previously established local model for a given asset or cohort or may be based on a model based on a similar asset. Typically, the global model 114 can have a deep learning model structure with a fixed architecture based on the static, semi-static, and dynamic features of the asset. The global models 114, based on the cohorts 112, can be deployed to each of a plurality of local sites 116.

Figure 2:
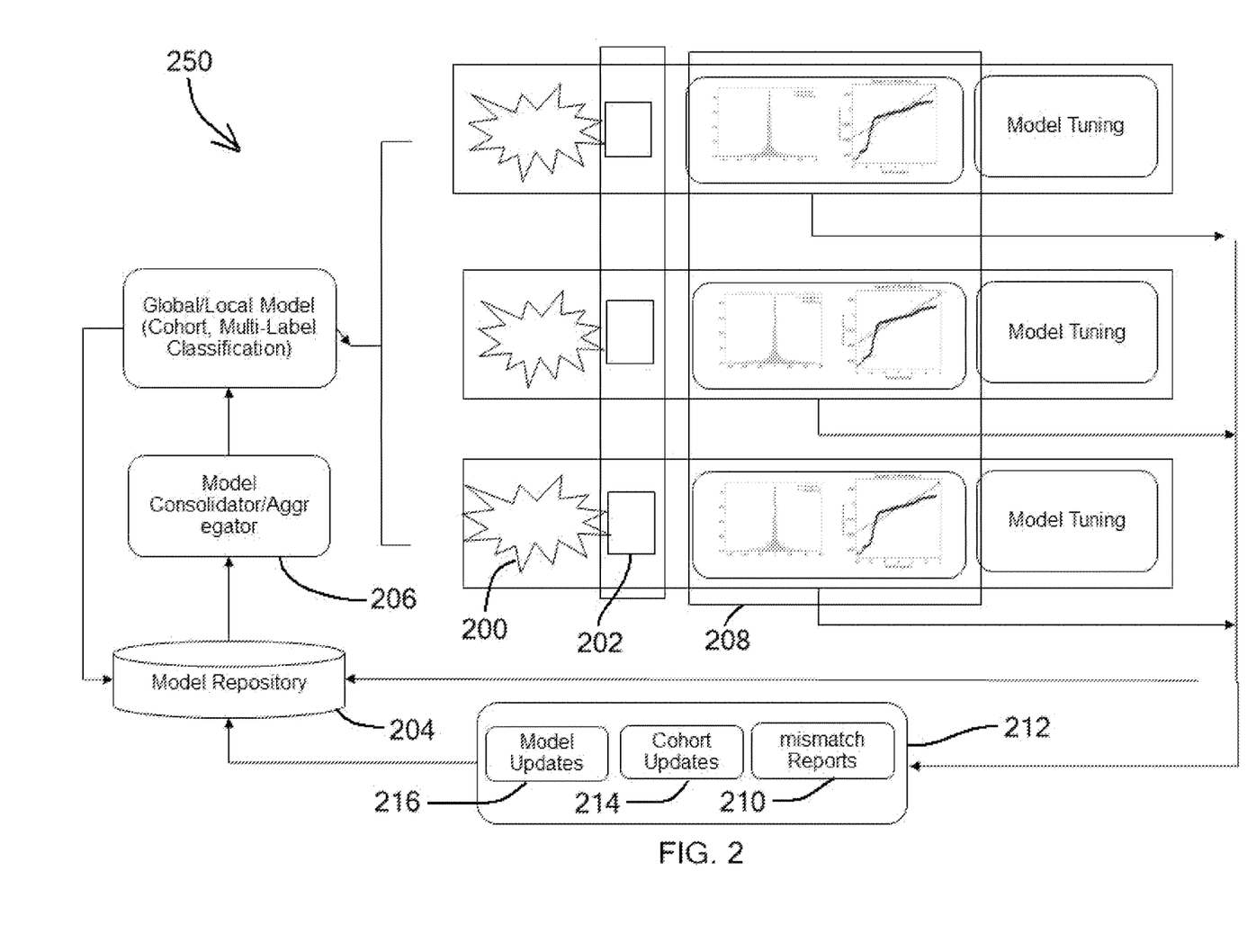
FIG. 2 is a representation of a system architecture of an asset failure prediction engine after deployment of federated models, illustrating model tuning and model updating, consistent with an illustrative embodiment.

Referring now to FIG. 2, each deployment site 200 (also referred to as each local site 200) can select a local model 202 from a model repository 204. The model repository 204 can include a global model for each cohort. In some embodiments, as discussed in greater detail below, the model repository can include both a global model and at least one local model for each cohort. A model consolidator/aggregator 206 may be provided to match models with cohorts and to limit the overall number of models by removing similar or identical local models.

Local mismatch analysis 208 may be performed at each deployment side 200, where the selected local model 202 can be monitored for model performance. Discrepancies between model predictions and actual asset performance may result in the reporting of a mismatch report 210 for federated analysis 212. This analysis is referred to as "federated analysis" because mismatch reports 210 from various local sites 200 may be analyzed together. Depending on the mismatch data, the system 250 may provide a cohort update 214 or a model update 216, which can be sent to the model repository 204. Further, each local site 200 can provide local model tuning 216. Details of model tuning 216 may be provided for federated analysis 212 and model updates 216 for an updated local model for the model repository 204.

Figure 3:
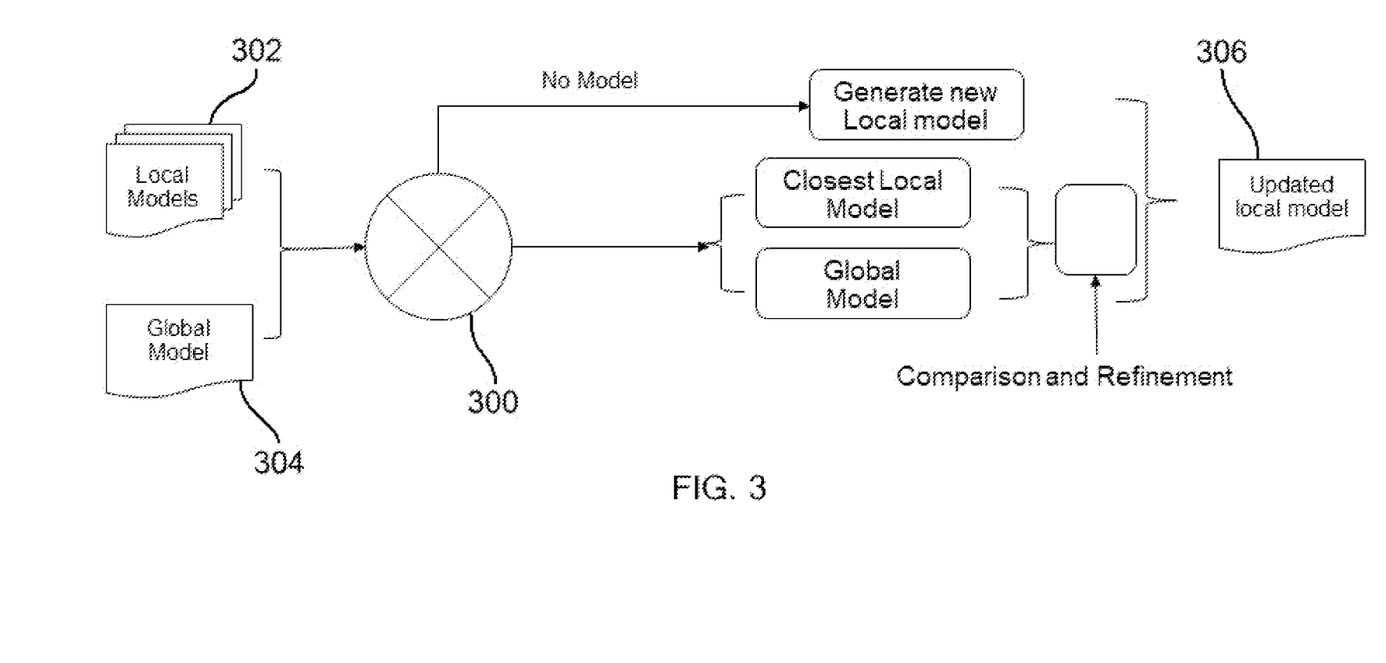
FIG. 3 illustrates a method for local model selection for a cohost at a local site, consistent with an illustrative embodiment.

Referring to FIG. 3, a pictorial representation of local model selection for a given cohort at a local site is described. The local site 300 can receive one or more local models 302 and a global model 304 for the given cohort. If there are no models available (as either global or local models) for a given cohort (such as when a new cohort is established at a local site), then a new local model is generated at the local site. This new local model may be, for example, based on a model for a similar asset at this site or another local site.

Two models can be selected for comparison and refinement. One of the selected models can be the global model for the given cohort, and the other model can be a local model from the local model pool. Various criteria may be used for selecting a local model from the local model pool, such as the similarity of the site providing the local model to the local site 300, the proximity of the site providing the local model to the local site 300, the performance metric of the local model, or the like. In some embodiments, the local model may be selected from a local model at the local site 300 itself. Data can be applied to the two selected models, and the performance can be analyzed. The best performing model can be selected as the new local model 306 for the given cohort at the local site 300. If there is a performance mismatch between the two models, tuning can be performed to generate the new local model and this new local model can be shared to the global model repository 204 (see FIG. 2).

Figure 4:
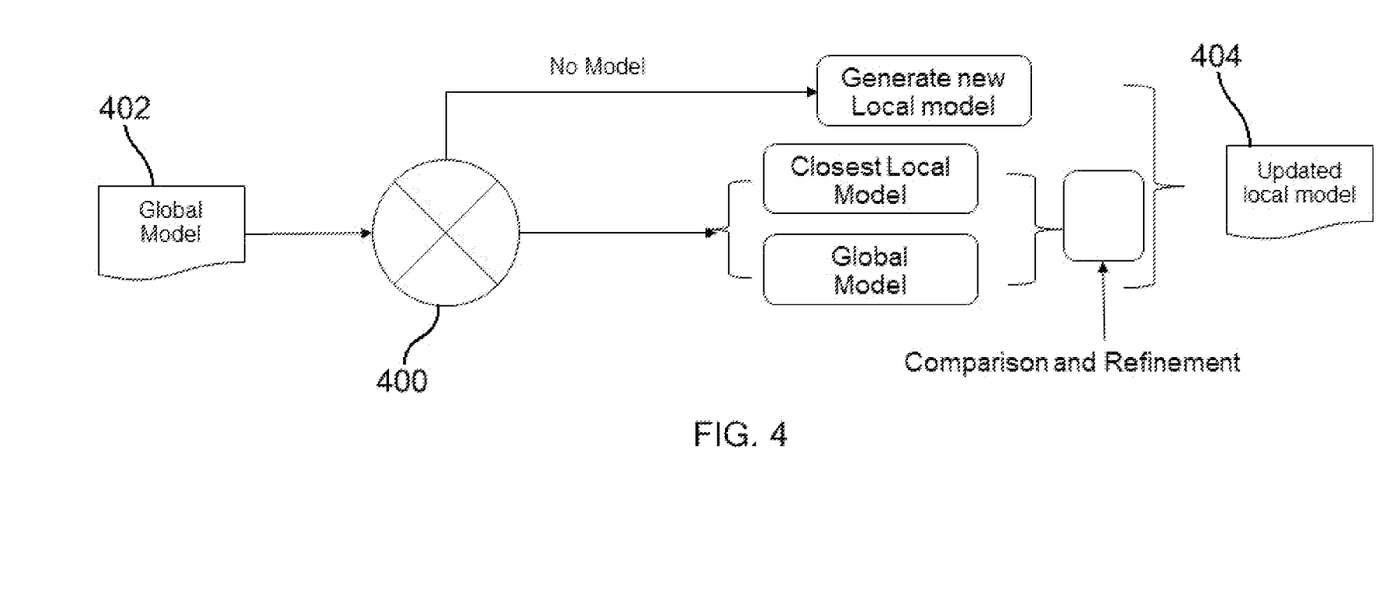
FIG. 4 illustrates a method for local model selection, without sharing of local models from other sites, consistent with an illustrative embodiment.

Referring to FIG. 4, in some embodiments, the local models may not be shared due to site management or privacy requirements. In this embodiment, a global model 402 may be provided to a local site 400 for a given cohort. Again, two models may be selected, where one model is the global model 204, and the other is the current version of the local model generated at the local site 400. If there is no local model currently at the local site 400, the local site 400 may create a local model in a manner similar to that discussed above with respect to FIG. 3. The models can be compared and refined, as described above, to generate an updated local model 404. When the global model 402 is updated, for example, as described below, then local model selection as shown in FIG. 4 may be repeated to generate the updated local model 404 based on the refined global model.

Figure 5:
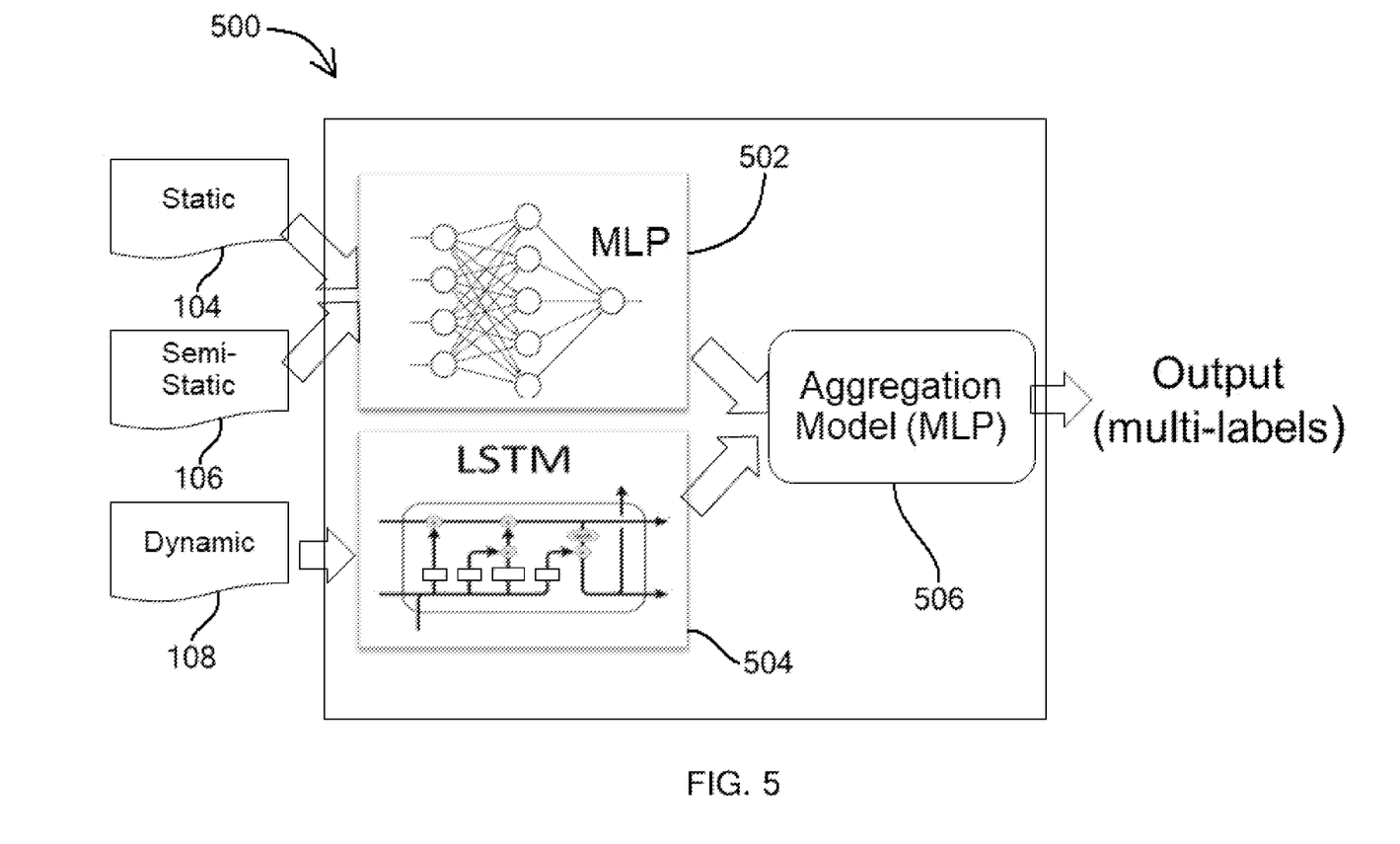
FIG. 5 illustrates a model template for future cohost multiple-label prediction, consistent with an illustrative embodiment.

Referring to FIG. 5, an abstract model template 500 can be defined for all cohorts. This abstract model template 500 may be used, for example, for model generation for new cohorts, to generate original global models or the like. The template 500 may input the static features 104 and the semi-static features 106 into a multilayer perceptron neural network 502. The template 500 can further input the dynamic features 108 into a long short-term memory neural network 504. The output from both networks 502, 504 may provide an aggregation model 506 for multiple-label prediction. The output of the template 500 may be an output of multi-labels, where the template 500 can be used for all future cohort multiple-label prediction.

Figure 6:
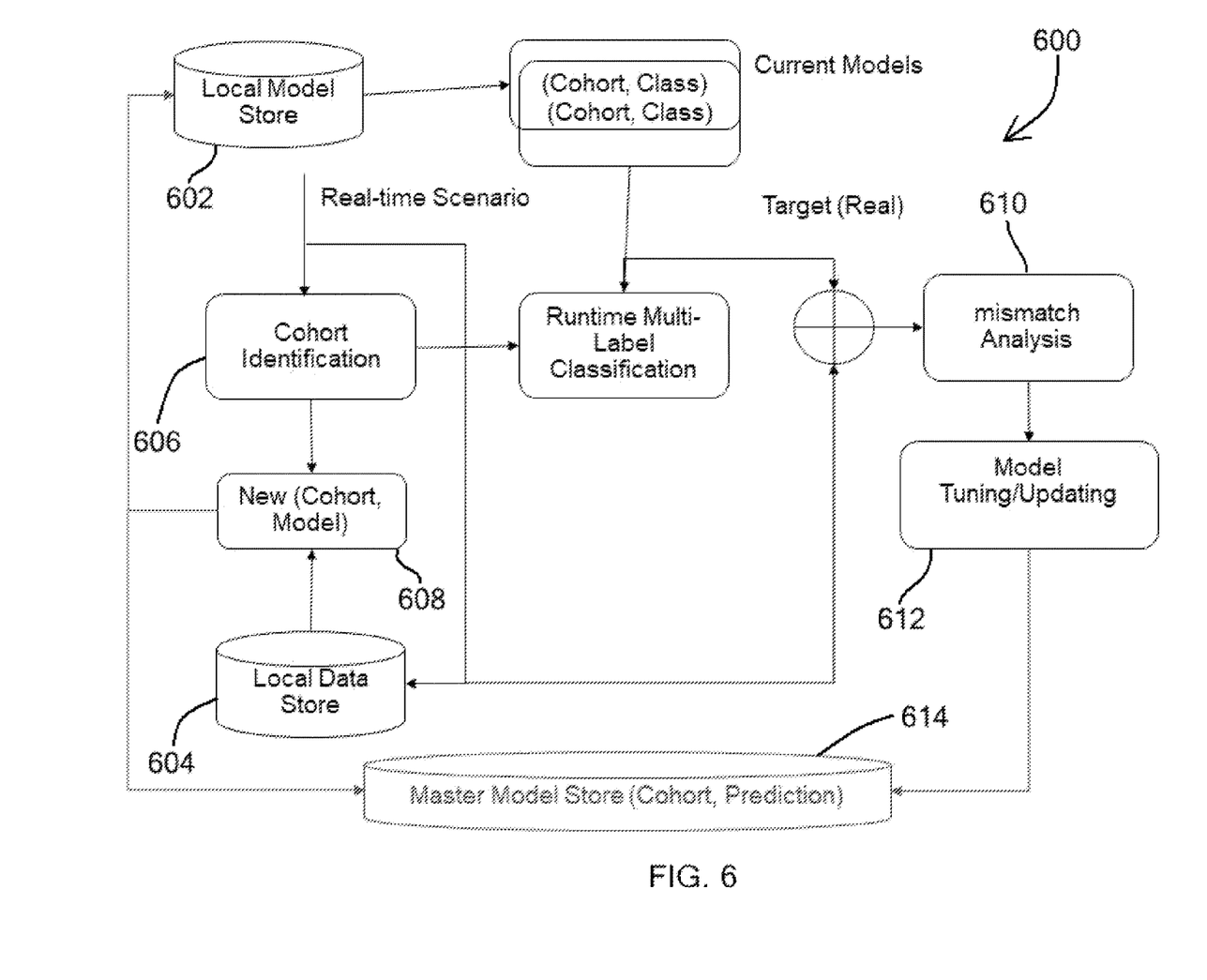
FIG. 6 illustrates an architecture model for mismatch and tuning at a local site, consistent with an illustrative embodiment.

Referring now to FIG. 6, a model 600 for tuning and model mismatch is provided. A local model store 602 can include information on at least the current local model at the local site. The local model store 602 can also include information on other local models at other sites for a given cohort. The local data store 604 may be used to help identify cohorts 606 or create new cohorts 608. As discussed above, two models may be operated with data from the local data store 604 to generate a mismatch analysis 610. Model tuning and/or updating 612 may be performed based on the mismatch analysis 610, and the updates may be provided to a master model store 614.

In addition to local model updates, the system may provide global model updates based on one or more assessment methods. For example, one method can include accessing the weights of each local model for a given cohort by averaging them (such as with a weighted average based on the number of assets in each local site) to generate an updated global model. In some embodiments, the global model may be updated by accessing only the last layer's weights of each model and averaging them to generate the global model. In this embodiment, the lower layers' weights would be the same for each local model. In other embodiments, the global model may be updated by using an ensemble approach to create a new global model based on each individual local model for a given cohort. The global model may be updated periodically or when new or updated local models are provided from one or more local sites.

Figure 7:
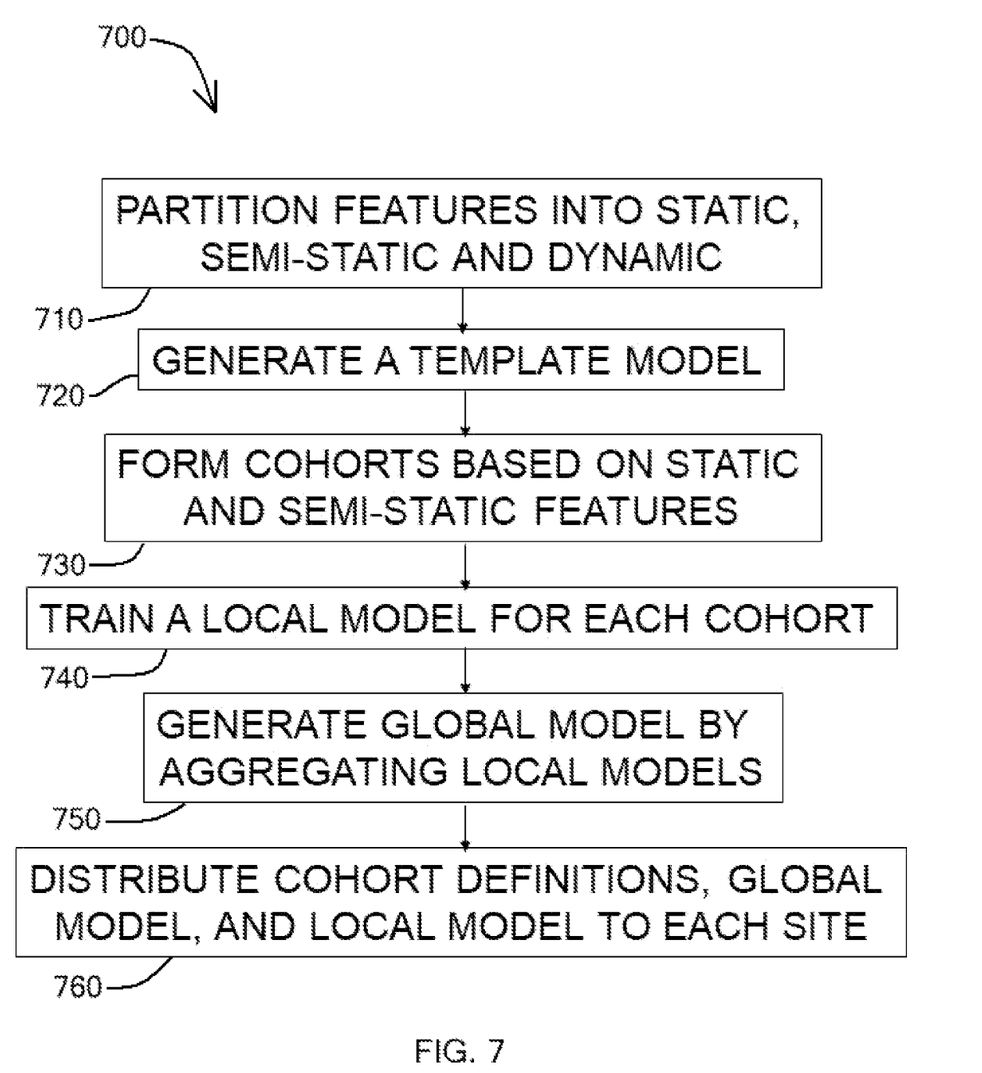
FIG. 7 is a flow chart illustrating acts involved with setting up an asset failure prediction engine, consistent with an illustrative embodiment.
Figure 8:
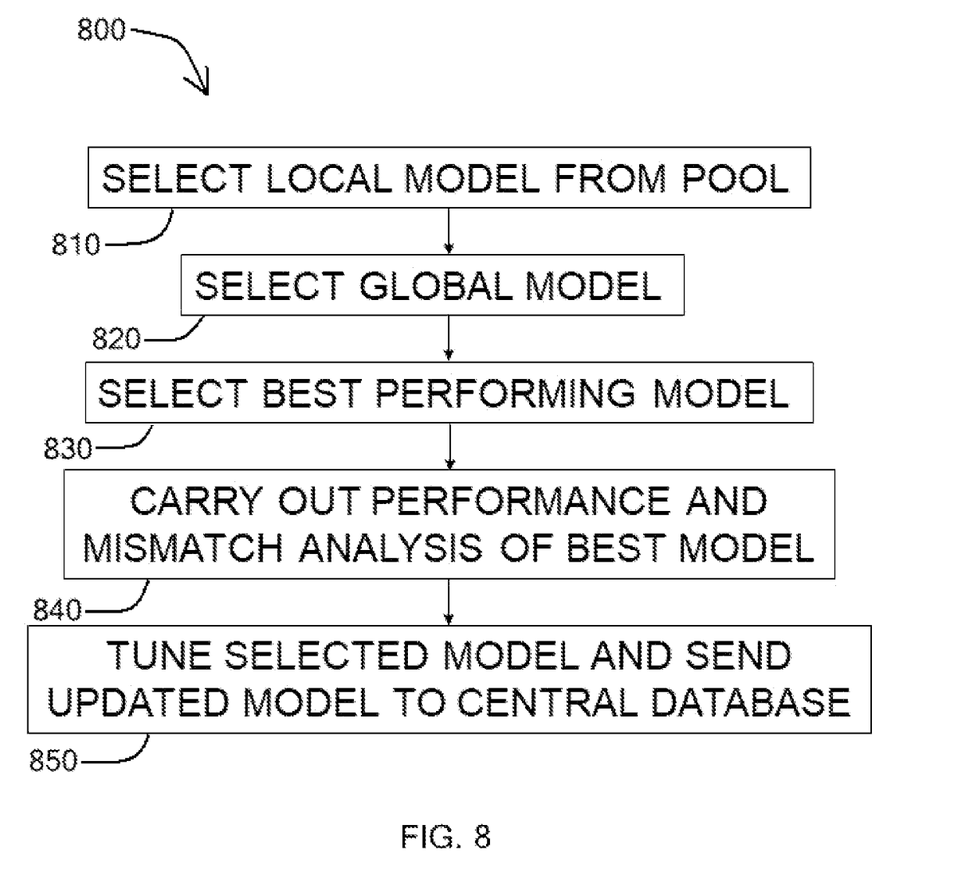
FIG. 8 is a flow chart illustrating acts involved with operating an asset failure prediction engine, consistent with an illustrative embodiment.

With the foregoing overview of the example system 250 (see FIG. 2), it may be helpful now to consider a high-level discussion of example processes. To that end, FIG. 7 presents an illustrative process 700 related to the establishment of the system 250, including local and global model generation. FIG. 8 presents an illustrative process 800 related to local site selection of a local model. Processes 700, 800 are illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 7, the process 700 for establishing a system for asset failure prediction includes an act 710 of partitioning features of the assets into static, semi-static, and dynamic features related to handling the characteristics of asset dynamics in different time scales. An act 720 can generate a template model to ensure the common model structure. FIG. 5, discussed above, provides an example of template model generation. An act 730 can include forming cohorts based on the static and semi-static features to group similar assets and allow a cohort specific model. In some embodiments, the system can automatically generate the cohorts based on the static and semi-static features. An act 740 can include training the local model with local knowledge for each cohort based on various failure types for the asset. An act 750 can include sharing the local knowledge to a central database and creating a global model that consolidates or aggregates the local knowledge to global knowledge for each cohort. At act 760, the central database can distribute the cohort definitions, global model and local models to each local site.

Referring to FIG. 8, the process 800 can include an act 810 where a local site can select a local model from a pool of local models. At act 820, the local site can also select the global model. At act 830, the local site can select the best model as the new model based on performance of the two selected models. At act 840, the local site can carry out performance and mismatch analysis of the best model. At act 840, the local site can tune the selected model and send data back the central database.

Figure 9:
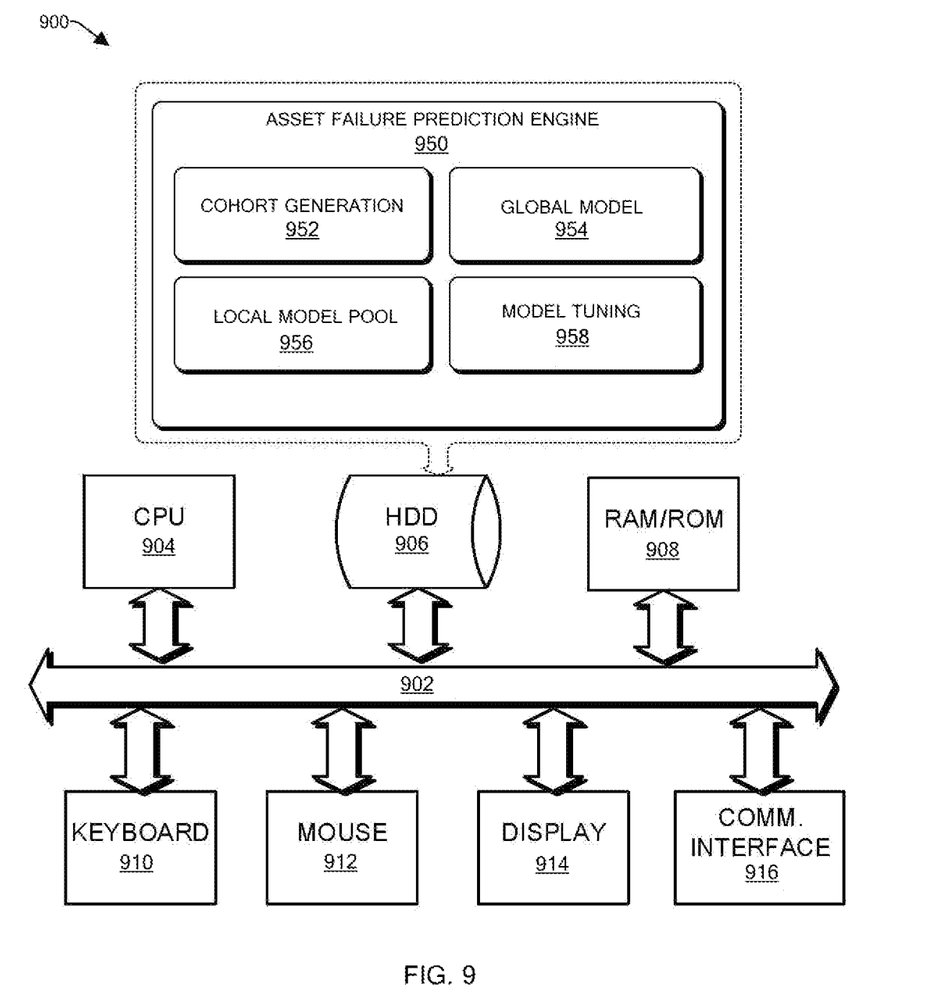
FIG. 9 is a functional block diagram illustration of a computer hardware platform that can be used to implement the asset failure prediction engine of FIG. 2.

FIG. 9 provides a functional block diagram illustration of a computer hardware platform 900 that can be used to implement a particularly configured computing device that can host an asset failure prediction engine 950. The asset failure prediction engine 950, as discussed above, can include a cohort generation module 952, a global model database 954, a local model pool 956 and a model tuning module 958.

The computer platform 900 may include a central processing unit (CPU) 910, a hard disk drive (HDD) 906, random access memory (RAM) and/or read only memory (ROM) 908, a keyboard 910, a mouse 912, a display 914, and a communication interface 916, which are connected to a system bus 902.

In one embodiment, the HDD 906, has capabilities that include storing a program that can execute various processes, such as asset failure prediction engine 950, in a manner described herein.

While the above discussion describes asset failure prediction management methods by sharing models among different sites, a similar system may be utilized within a single site, where multiple uses of the same asset (a cohort) may be realized across a single site. In this embodiment, sharing of models, without sharing data, may be beneficial to develop and improve failure prediction models within a single site.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method of predicting failure of mining assets at different sites, using federated learning, comprising:
    partitioning features of the mining assets from the different sites into static features, semi-static features and dynamic features;
    forming cohorts of the mining assets based on the static features and the semi-static features of the partitioned static features, semi-static features and dynamic features;
    generating a local model at a local site for each of the cohorts;
    training the local model on local data for each of the cohorts for each failure type;
    sharing the trained local model with a central database;
    creating a global model using federated learning based on an aggregation of a plurality of the local models from a plurality of the local sites; and
    at each of the plurality of local sites:
        choosing the global model or the local model for each of the cohorts of mining assets; and
        operating the chosen model on local data to predict failure of one or more of the mining assets belonging to one of the cohorts.

2. The computer implemented method of claim 1, further comprising generating a template model for creating each of the local models for each of the cohorts.

3. The computer implemented method of claim 1, further comprising:
    pooling the local models from each of the plurality of local sites in to a pool of local models; and
    determining a performance of the global model and a selected one of the local models from the pool of local models.

4. The computer implemented method of claim 3, wherein the chosen model is selected based on the performance of the global model and the selected one of the local models.

5. The computer implemented method of claim 3, further comprising determining a mismatch between the global model and the selected one of the local models.

6. The computer implemented method of claim 3, further comprising tuning the chosen model based on the local data of the mining assets to improve performance of the local model.

7. The computer implemented method of claim 6, further comprising providing the tuned chosen model to the pool of local models.

8. The computer implemented method of claim 3, further comprising updating the global model based on an average of each of the local models in the pool of local models for each of the cohorts.

9. The computer implemented method of claim 3, wherein each of the local models in the pool of local models are weighted based on an average number of mining assets of the local site that provided the local model to the pool of local models.

10. A computer implemented method for predicting failure of mining assets at different sites, using federated learning, comprising:
   partitioning features of the mining assets from the different sites into static features, semi-static features and dynamic features;
   forming cohorts of the mining assets based on the static features and the semi-static features of the partitioned static features, semi-static features and dynamic features;
   generating a local model at a local site for each of the cohorts;
   sharing the local model with a central database;
   forming a pool of local models from a plurality of the local models from a respective plurality of the local sites;
   creating a global model using federated learning based on an aggregation of the plurality of the local models from the plurality of the local sites;
   at each of the plurality of local sites:
      choosing one of the global model and one of the plurality of local models from the pool of local models for each of the cohorts of mining assets; and
      operating the chosen model on local data to predict the failure of one or more of the mining assets belonging to one of the cohorts.

11. The computer implemented method of claim 10, further comprising generating a template model for creating each of the local models for each of the cohorts.

12. The computer implemented method of claim 10, further comprising determining a mismatch between the global model and the chosen model.

13. The computer implemented method of claim 10, further comprising tuning the chosen model based on local data to improve a performance of the local model.

14. The computer implemented method of claim 13, further comprising providing the tuned chosen model to the pool of local models.

15. The computer implemented method of claim 10, further comprising updating the global model based on an average of each of the local models in the pool of local models for each of the cohorts.

16. The computer implemented method of claim 15, wherein each of the local models in the pool of local models are weighted based on an average number of mining assets of the local site that provided the local model to the pool of local models.

17. A computer implemented method for prediction failure of mining assets at different sites, using federated learning, comprising:
   partitioning features of the mining assets from the different sites into static features, semi-static features, and dynamic features;
   forming cohorts of the mining assets based on the static features and the semi-static features of the partitioned static features, semi-static features and dynamic features;
   generating a local model at a local site for each of the cohorts;
   creating a global model using federated learning for each of the cohorts;
   at all local sites of each cohort:
      choosing one of the global model and the local model for each of the cohorts of mining assets; and
      operating the chosen model on data local to a site of the different sites to predict failure of one or more of the mining assets belonging to one of the cohorts.

18. The computer implemented method of claim 17, further comprising:
   storing each of the local models for all local sites of each cohort in a central database; and
   updating the global model based on an average of each of the local models in a pool of local models for each of the cohorts.

19. The computer implemented method of claim 18, wherein each of the local models in the pool of local models are weighted based on an average number of mining assets of the local site that provided the local model to the pool of local models.

20. The computer implemented method of claim 18, further comprising:
   at all local sites of each cohort:
      choosing one of the updated global model and the local model for each of the cohorts; and
      operating the chosen model on local data to predict failure of the mining assets.

21. A non-transitory computer readable storage medium tangibly embodying a computer readable program code having computer readable instructions that, when executed by a processor, causes a computer device to carry out a method of prediction failure of mining assets at different sites, using federated learning, the method comprising:
   partitioning features of the mining assets into static features, semi-static features, and dynamic features;
   forming cohorts of the mining assets based on the static features and the semi-static features of the partitioned static features, semi-static features and dynamic features;
   generating a local model at a local site for each of the cohorts;
   sharing the local model with a central database;
   forming a pool of local models from a plurality of the local models from a respective plurality of the local sites;
   creating a global model using federated learning based on an aggregation of the plurality of the local models from the plurality of the local sites;
   at each of the plurality of local sites:
      choosing, one of the global model and one of the plurality of local models from the pool of local models for each of the cohorts of mining assets; and
      operating the chosen model on data local to a site of the different sites to predict failure of one or more of the mining assets belonging to one of the cohorts.

22. The non-transitory computer readable storage medium of claim 21, wherein the execution of the code by the processor further configures the computing device to perform an act comprising generating a template model for creating each of the local models for each of the cohorts.

23. The non-transitory computer readable storage medium of claim 21, wherein the execution of the code by the processor further configures the computing device to perform an act comprising updating the global model based on an average of each of the local models in the pool of local models for each of the cohorts.

24. A non-transitory computer readable storage medium tangibly embodying a computer readable program code having computer readable instructions that, when executed, causes a computer device to carry out a method of prediction failure of mining assets at different sites, using federated learning, the method comprising:
    partitioning features of the mining assets from the different sites into static features, semi-static features and dynamic features;
    forming cohorts of the mining assets based on the static features and the semi-static features of the partitioned static features, semi-static features and dynamic features;
    generating a local model at a local site for each of the cohorts;
    creating a global model for each of the cohorts;
    at each of a plurality of local sites:
        choosing one of the global model and the local model for each of the cohorts of mining assets; and
        operating the chosen model using federated learning on data local to a site of the different sites to predict failure of one or more of the mining assets belonging to one of the cohorts.

25. The non-transitory computer readable storage medium of claim 24, wherein the execution of the code further configures the computing device to perform acts comprising:
    storing each of the local models for the plurality of local sites in a central database; and
    updating the global model based on an average of each of the local models in a pool of local models for each of the cohorts.

* * * * *